Patented May 6, 1952

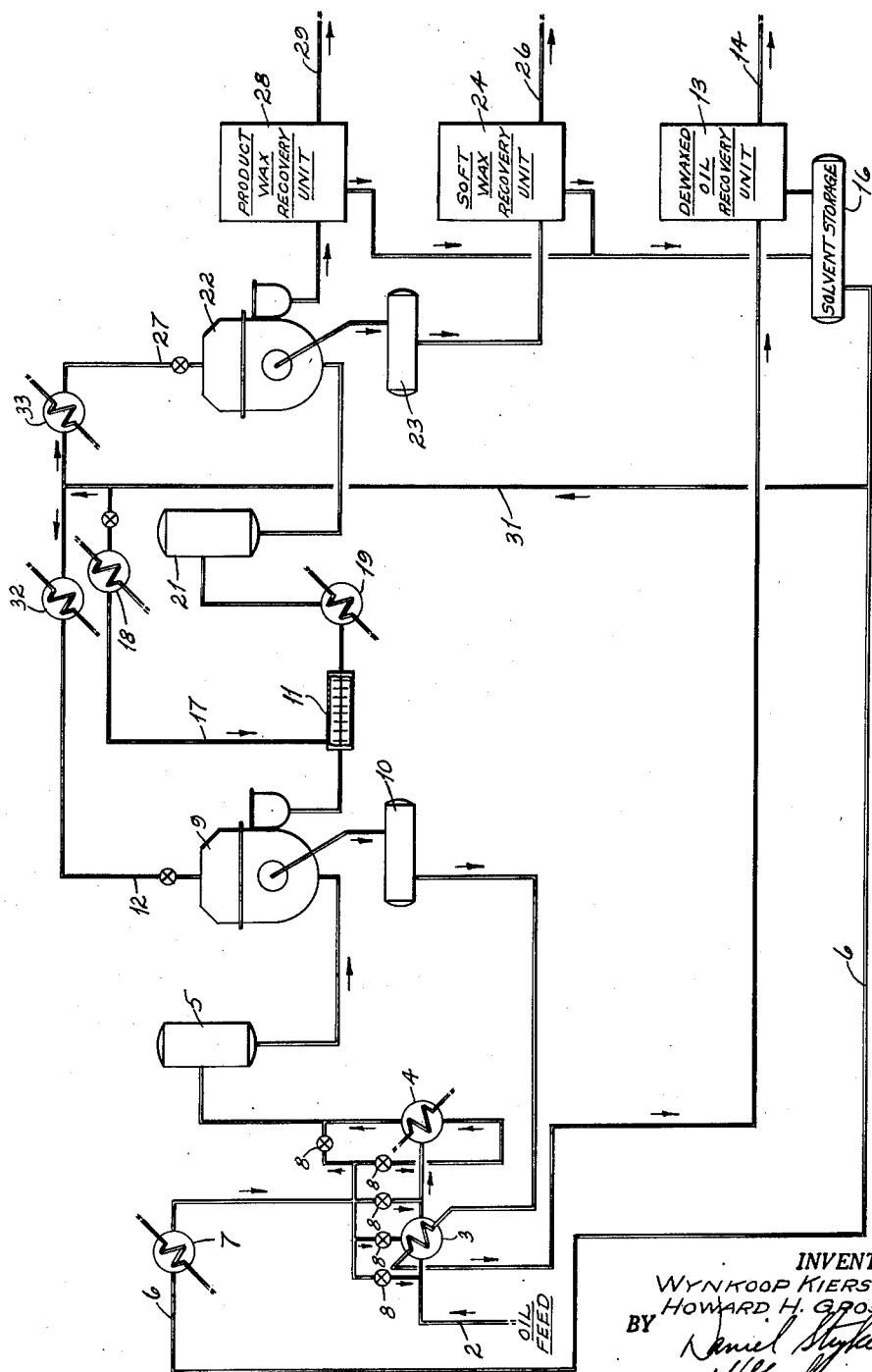

2,595,468

UNITED STATES PATENT OFFICE 2,595,468

SOLVENT SEPARATION OF WAX FROM HYDROCARBON MIXTURES

Wynkoop Kiersted, Jr., Scarsdale, and Howard H. Gross, Pleasantville, N. Y., assignors to Texaco Development Corporation, New York, N. Y., a corporation of Delaware Application June 24, 1947, Serial No. 756,658

3 Claims. (Cl. 196—18)

This invention relates to a process for the fractionation of hydrocarbons. In one of its more specific aspects, it relates to a process for the separation of wax from hydrocarbon oil. This invention also relates to a process for the separation of wax into various fractions having different physical properties, for example, different melting points.

It is known that hydrocarbons may be separated into fractions of different physical properties by the use of solvents. A number of solvents are known which are useful for effecting a separation between a hydrocarbon oil and wax. Such solvents include hydrocarbons less viscous than the oil, e. g., propane, naphtha, benzene, toluene, and the like; ketones, e. g., acetone, methyl ethyl ketone, methyl propyl ketones, methyl butyl ketones, and the like; aldehydes, e. g., benzaldehyde, furfural, and the like; ethers, e. g., isopropyl ether; alcohols, e. g., butyl alcohol; chlorinated hydrocarbons, e. g., orthodichlorobenzene, ethylene dichloride; aniline; liquid sulfur dioxide and numerous other liquids. Solvents which are useful for the separation of wax from oil are those which are miscible with the oil at the separation temperature and in which wax is insoluble or is only slightly soluble. Various processes which have been developed for separating solid wax from other components in hydrocarbon mixtures comprising wax with the aid of solvents are known as solvent dewaxing, deoiling, wax manufacture, and wax fractionation. These processes involve the separation of solid wax from a solution of other components of a hydrocarbon mixture comprising wax components using a single solvent or a composite mixture of two or more solvents. Dewaxed oil and various grades of waxes may be produced by solvent processes.

The present invention is concerned with the separation of hydrocarbon mixtures comprising wax into fractions having different physical properties. This invention is especially useful in solvent dewaxing of mineral oils, particularly lubricating oil stocks; deoiling wax, e. g., slack wax from dewaxing operations; and separation of various grades of product wax by solvent fractionation or fractional crystallization from petroleum mixtures comprising wax. Dewaxing and deoiling are well known operations involving a separation between wax and oil with the aid of an oil solvent. The present invention is applicable to those processes which employ an oil solvent for deoiling or dewaxing. This invention is also particularly applicable to the manufacture of wax products by separation of higher melting point waxes from a hydrocarbon mixture containing wax components with the aid of a solvent of the undesired oil or soft, lower melting point waxes. The separation of solid wax from a liquid solution formed by admixing a selective solvent with a hydrocarbon mixture containing wax components to produce a product wax is sometimes referred to as wax fractionation or wax manufacture. Paraffin hydrocarbons which are normally solid are referred to as waxes.

An object of this invention is to provide an improved process for the fractionation of hydrocarbon mixtures. Another object is to provide an improved process for the fractionation of a hydrocarbon mixture comprising wax. Still another object is to provide an improved process for the separation of waxes having desired physical properties from hydrocarbon mixtures containing the same. Another object is to provide an improved process for effecting a separation between wax and oil by solvent fractionation. A further object is to provide a method for the separation of various grades of waxes from one another by the solvent fractionation. Other objects and advantages of this invention will be apparent from the detailed description and the accompanying drawing, which is a diagrammatic illustration of one of the specific embodiments of our invention.

In general, the process of the present invention is carried out as follows: A hydrocarbon mixture containing wax components at an initial temperature such that at least a portion of the wax is in solid or crystalline form is diluted with a suitable solvent which is miscible with the components of the mixture other than the solidified wax. The temperature of the mixture is increased either concurrently with the solvent addition or after the solvent has been added. The resulting intermediate temperature—the maximum temperature of the dilute mixture—is such that a minor portion of the solid wax is dissolved due to the increase in temperature. In accordance with one preferred embodiment of the invention, the hydrocarbon mixture (for example, a mixture comprising wax and oil) containing solid particles of wax is admixed with solvent which is at a temperature somewhat above the temperature of the mixture. The temperature of the resulting dilute mixture is reduced to the desired separation temperature, a temperature somewhat below the maximum temperature of the dilute mixture, and the solid wax separated therefrom. While solid wax may be separated from the liquid solution by various means, filtration is preferred. It is essential that the intermediate temperature or maximum dilute mixture temperature be such that only a minor portion (less than 50 weight per cent) of the desired resolidified wax at the initial temperature is dissolved. It follows that the intermediate temperature is less than the temperature at which complete solution of wax takes place. Preferably, the intermediate temperature is so adjusted that from about 2 to 30 weight per cent of the desired wax which was in solid form at the initial temperature is dissolved at the intermediate temperature.

It is essential also that the solidified wax be separated from the solution at a temperature below the intermediate or maximum dilute mixture temperature. The solvent may be added to the hydrocarbon mixture either in a single addition or by successive additions. The later or incremental addition is often preferred. The intermediate temperature or maximum dilute mixture temperature should be at least 5° F. above the initial temperature and at least 5° F. above the temperature at which the wax is separated from the solution. The maximum dilute mixture temperature (intermediate temperature) may be within the range of from about 5° F. to about 50° F. above the separation temperature; preferably this temperature is within the range of from about 20° F. to about 40° F. above the filtration temperature. Operation in accordance with this invention results in an improved separation between the solidified wax components and the lower melting components, such as, for example, oil or soft wax.

The selective solvent used in the present invention in general may be any selective solvent which is useful for dewaxing of lubricating oils. A large number of such solvents are known in the art. Suitable solvents are those which are miscible with the components other than solidified wax, i. e., the oil or liquid fraction of the mixture, under operating conditions and which have low solvent action on the solidified wax, i. e., the higher melting point wax or solid fraction. The selective solvent used in practicing the invention may advantageously comprise a mixture of an oil solvent, for example, benzol, toluol, or the like, and a wax anti-solvent, for example, acetone, methyl ethyl ketone, or the like. Other anti-solvents besides the aliphatic ketones may be employed, as for example, sulfur dioxide, furfural, phenol, benzaldehyde, formates, acetates, etc. Likewise, other oil solvents may be used beside aromatic hydrocarbons, as for example, low boiling aliphatic ether, such as isopropyl ether; halogenated aliphatic hydrocarbons, such as propylene dichlorides; and chlorinated aromatic hydrocarbons, such as chlorobenzene.

The present invention may be advantageously applied to dewaxing of oils. A procedure for effecting improved dewaxing operations in accordance with this invention follows. In a preferred embodiment, the oil to be dewaxed is chilled below the wax crystallization temperature to a temperature in the vicinity of the filtration temperature, as determined by the desired pour point of the finished oil. The solvent may be added to the oil by incremental addition during the chilling; preferably, successive small portions are added during the chilling and the final addition of solvent is made after the oil reaches the approximate initial reduced temperature. The total quantity of solvent used should be such that the ratio of solvent to oil in the diluted mixture is within the range of from about one to about six volumes of solvent per volume of oil, advantageously about three volumes of solvent per volume of oil. The temperature of the resulting dilute mixture of solvent and oil is then increased either after dilution with the solvent or concomitantly therewith to an intermediate temperature, higher than the filtering temperature and such that only a minor portion (e. g., 2 to 30 per cent) of the desired wax in solid form at the initial reduced temperature is redissolved at the intermediate temperature. The mixture of oil and solvent is then chilled at least 5° F. to the desired predetermined separation temperature and filtered to effect the separation between the solid wax particles and the liquid solution. The filtering temperature is determined by the particular lubricating oil stock and solvent used and by the desired pour point of the finished oil as is known in the art. In general, using a hydrocarbon solvent such as propane, the filtering temperature must be somewhat lower than when using a solvent mixture, such as benzol-methyl ethyl ketone mixture. Several important advantages accrue from the use of the process of the present invention as applied to dewaxing in contrast with conventional processes wherein the oil is chilled to the filtering temperature and filtered without raising the temperature of the dilute mixture to an intermediate temperature prior to chilling to the filtering temperature. These include improved filtering rates, higher oil yields, and improved wax quality.

The present invention is particularly adapted to use in deoiling operations, i. e., removal of oil from wax, and in wax fractionation, i. e., separation of higher melting point wax from lower melting point wax. Usually, wax obtained from dewaxing mineral oil, must be further solvent processed to separate oil from the wax cake. In the conventional processes wax cake is solvent deoiled by admixing the wax with additional solvent, chilled to the filtering temperature and the wax refiltered at the same temperature as the primary filtering temperature, i. e., the temperature at which the wax was originally separated from the oil. The operation is usually carried out by breaking up the wax cake and dispersing the wax in finely divided form in the solvent. This is known as repulping the wax cake. In accordance with the present invention the wax cake at a temperature approximately the filtering temperature, or at a lower temperature, is admixed with the solvent and the temperature of the resulting dilute mixture raised either concurrently with the solvent addition or after dilution to an intermediate temperature at least 5° F. above the desired filtering temperature. The dilute mixture is then chilled to the filtering temperature and the solid wax separated from the solution by filtration. This method presents several advantages over the conventional practices. As compared to conventional repulping, the rate of filtration is greatly increased. As compared to recrystallization, the oil content of the resulting wax is considerably reduced, the oil yield is increased, and the yield and quality of the product wax is increased. Thus an improved separation is obtained between the wax and the oil.

Similarly, waxes of various grades or types may be separated from one another in accordance with this invention by admixing wax at an initial temperature near the desired separation temperature with solvent, warming the mixture to an intermediate dilute mixture temperature, whereupon a minor portion, preferably 2 to 30 weight per cent, of the desired wax solid at the initial temperature is dissolved, chilling the mixture to the desired filtering temperature, and separating the solidified wax from the resulting solution. The desired filtering temperature is determined by the particular solvent and by the melting point of the wax which it is desired to recover, as is known in the art.

In general, to deoil wax, the secondary or deoiling filtration is carried out at approximately the same temperature (with the same or comparable solvents) as the primary filtration or dewaxing temperature. Wax fractionation is accomplished by dispersing the wax in the solvent and filtering the crystalline wax from the solvent at a temperature somewhat higher than the primary filtration. Alternatively, different solvents may be used. Some of the soft wax, or lower melting point wax, is taken into solution permitting a separation of the higher melting wax by filtration.

The accompanying drawing illustrates diagrammatically the application of the present invention in dewaxing a mineral oil to produce an oil fraction suitable for use as a lubricating oil and separation of the wax into product waxes having different physical properties. It is to be understood that the following detailed description is for the purpose of illustrating the present invention and is not to be construed as limiting the invention.

Oil containing paraffin wax in solution is introduced into the system through line 2 and passed through heat exchanger 3 and chiller 4 to cold storage feed tank 5. Solvent from line 6 at a temperature adjusted by a heat exchanger 7 is admixed with the oil and may be added to the oil at any one or more of a number of points during the chilling operation in desired quantities as controlled by valves 8. The chilled mixture from the cold storage feed tank 5 is then passed to a continuous type primary filter 9 from which dewaxed oil solution is withdrawn to the run tank 10. The filter may be of the rotating drum type or of the rotating leaf type. The wax cake is washed in the filter in conventional manner by cold wash solvent entering through line 12. The dewaxed oil solution from run tank 10 is passed through heat exchanger 3 in indirect heat exchange with the fresh oil to cool the incoming oil feed stream and from there is sent to the dewaxed oil recovery unit 13, wherein solvent is removed from the oil. Oil, free from solvent, is withdrawn from the system through line 14 as a product. The solvent is conducted to a storage tank 16 from which it may be returned through line 6 for further use in treating fresh incoming oil.

The primary wax cake from the filter 9 is broken up or repulped in mixer 11 and comingled with additional solvent from line 17, the temperature of which may be controlled by the heat exchanger 18. The solvent admixed with the wax cake via line 17 is preferably considerably warmer than the wax cake, so that the resulting diluted mixture of wax and solvent is at a temperature considerably above the primary filtering temperature and at least 5° F. above subsequent filtering temperature. The resulting diluted mixture is then chilled to the secondary or repulping filtering temperature in cooler 19 and passed into feed tank 21. From the feed tank 21 the chilled repulped wax mixture passes to the repulping filter 22, wherein the solid wax is separated as a wax cake. Solvent, together with dissolved soft wax is removed as filtrate to run tank 23. From tank 23 the soft wax and solvent are passed to soft wax recovery unit 24, wherein a separation is made between the soft wax and the solvent, the soft wax being taken from the system through line 26 and the solvent returned to the solvent storage tank 16. The product wax in the repulping wax filter 22 is washed in conventional manner by wash solvent admitted to the filter through line 27. Product wax cake taken from the filter is passed to product wax recovery unit 28, wherein solvent is separated from the wax. The solvent is returned to solvent storage 16 and the product wax withdrawn from the system through line 29. Solvent for repulping and for washing the wax cakes in the filters is supplied to the various lines 12, 17 and 27 via a feed line 31. The usual heat exchanger type chilling units 32 and 33 are provided to cool the wash solvent streams for each of the filters to the filtering temperature.

As a specific example of the application of the present process, as illustrated in the flow diagram, an oil charge suitable for a lubricating oil stock and containing wax components in solution is fed into the system through line 2. Solvent is added to the oil at the various points along its path of flow through the heat exchangers 3 and 4 by adjustment of the valves 8 to give a resulting mixture temperature of 5° F. in feed tank 5. The primary filter is operated at 5° F., using wash solvent entering through line 12 at the same temperature. The primary wax cake is passed to the repulping mixer 11 and admixed with sufficient warm solvent at a temperature of approximately 50° F., to raise the temperature of the mixture to 35° F. The resulting mixture is then chilled in cooler 19 to 10° F. and filtered at this temperature in repulping wax filter 22. Wash solvent at the same temperature (10° F.) is supplied to the filter through line 27. An improved product wax is obtained from the filter cake from the repulping filter 22. The improved operation of the repulping filter and quality of product wax will be apparent from the following examples.

The following examples are presented to illustrate various applications of the present invention without restriction of the scope of the invention. These examples are illustrative only and are not intended as a comprehensive presentation of all of the possible applications of the invention.

*Example I*

A wax distillate lubricating oil stock suitable for the production of dewaxed lubricating oil of S. A. E. 20 viscosity was dewaxed using a composite solvent. The solvent contained 60 parts methyl ethyl ketone by volume, 22 parts toluene and 18 parts benzene. The oil was chilled from 120° F. to 5° F. with incremental addition of the solvent during the chilling period. The undiluted oil was cooled from 120° F. to 100° F.; 0.2 part solvent was added at 100° F.; 0.2 part, at 80° F.; 0.2 part, at 60° F.; 0.4 part, at 40° F. and 1.5 parts, at 5° F. The quantities of solvent in each instance are expressed in parts by volume per part of oil charged. The total solvent addition amounted to 2.5 volumes of solvent per volume of oil treated. The resulting mixture was filtered at 5° F. to remove solidified wax, using a continuous rotary filter. The wax cake was washed on the filter with an additional 1.5 parts by volume of fresh solvent. The pour point of the finished oil obtained as filtrate was 20° F.

The primary wax cake so obtained (M. P. 134° F.) was repulped with an additional quantity of solvent equal to 1.0 part by volume based on volume of the original oil charged or 8.1 parts by volume based on the wax cake. The temperature at which the repulping operation was carried out was 5° F. The resulting mixture of repulped wax and solvent was filtered on a continuous type filter with washing of the repulping filter wax cake with an additional 7.3 parts of solvent by volume based on the volume of repulping filter wax cake. The filter rate was 16 pounds of wax per square foot of filter surface per hour. The tensile strength of the wax so recovered from the repulping filter was about 240 pounds per square inch, as determined by a Tinius-Olsen testing machine, indicating a high quality wax. Attempts to improve the filter rate by use of increased quantities of solvent in the repulping operation were unsuccessful; there was no appreciable effect on the filter rate.

Example II

A portion of the primary wax cake obtained from dewaxing the lubricating oil stock of Example I, in accordance with the process described in detail therein was treated in accordance with the process of the present invention. The primary wax cake at 5° F. was admixed with 8.2 parts by volume additional solvent, on the basis of the volume of the wax cake and repulped under conditions such that the temperature of the dilute mixture was 46° F. The resulting dilute mixture was then chilled to 5° F. and filtered on a continuous filter using 7.3 parts additional solvent, on the basis of the wax cake, for washing the wax filter cake. The tensile strength and quality of the product wax was comparable with that obtained from the repulping operation of Example I, but the filter rate increased to 37 pounds of wax per square foot of filter surface per hour.

Under comparable conditions primary wax cake was dissolved at 120° F. in 12.9 parts by volume of solvent per part wax and the resulting dilute mixture chilled to the filtering temperature to effect recrystallization of the wax. The filter rate was comparable with the filter rate obtained by the process of the present invention but the quality of the product wax, as indicated by tensile strength was considerably less (208 pounds per square inch) than in the above described test and the oil content as determined by the A. S. T. M. method of testing was approximately doubled.

Example III

Solvent-free slack wax obtained from a solvent dewaxing operation was liquefied and diluted incrementally with solvent, while chilling from 170° F. to 45° F. The solvent used in this operation was 90 per cent methyl ethyl ketone and 10 per cent toluene by volume. The total volume of solvent employed amounted to 3.0 volumes per volume of wax. Solidified wax was separated from the resulting solution by filtration at 45° F. and washed on the filter with 1.6 volumes of additional solvent per volume of wax feed. The wax cake obtained from the filter contained 11.6 volume per cent oil.

The wax cake was repulped at 45° F. with 5.0 volumes of additional solvent per volume of wax on a total solvent basis operation. The resulting mixture was again filtered at 45° F. and washed with 3.3 volumes additional solvent per volume of wax based on the wax charged. The A. S. T. M. oil content of the product wax from the repulping filter was 2.68 volume per cent.

Example IV

A portion of the wax obtained from the first filtration of Example III was repulped with the solvent while increasing the temperature from 45° F. to 77° F. The repulped mixture was then rechilled to 45° F., filtered and washed, as in Example III. The A. S. T. M. oil content of the resulting product wax from the repulping filter was 2.4 volume per cent.

Examples V and VI

A low boiling (2 to 20 percent) fraction obtained by vacuum fractionation of the slack wax of Example IV was treated as follows: Solvent was added to the liquefied wax by incremental addition while chilling to 45° F. using a total of 2 volumes of solvent per volume of wax. The diluted mixture was filtered at 45° F. and the wax cake washed on the filter. The resulting wax cake contained 3.47 percent oil by volume. The wax cake was divided into two portions.

The first portion was repulped at 45° F. in additional solvent using 4 parts of solvent per part of wax with washing on the filter with 2.9 parts solvent per one part wax. The A. S. T. M. oil content of the resulting cake was 0.64 per cent by volume.

The second portion of the wax was repulped with 4 volumes of solvent per volume of wax with an increase of temperature from 45° F. to 75° F. The diluted mixture was then chilled from the dilution temperature of 75° F. to 45° F., filtered and washed on the filter with 2.1 volumes of solvent per volume of wax. The A. S. T. M. oil content was 0.44 percent by volume.

The foregoing examples clearly illustrate the improved operation and advantageous results which are brought about by the use of the process of the present invention. In a number of comparative test runs, it was found that without exception, other conditions remaining equal, the quantity and quality of the product wax produced by complete solution followed by chilling to effect recrystallization is appreciably lower than the quantity and quality of the wax produced by adding solvent with warming of the diluted wax mixture from the primary filtration temperature to an intermediate temperature approximately 25 to 30° above the desired filtration temperature and then chilling the mixture to the filtration temperature prior to filtering. Likewise, without exception, the filtration rates obtained in comparative tests used for evaluation of the method of the present invention were appreciably higher than the filtration rates obtained by merely repulping the wax cake at the desired filtering temperature and filtering. The improvement in filtration rates obtained by the process of the invention was particularly noticeable in those instances where the desired repulp filtration temperature was higher than the initial or primary filtration temperature.

The present method of operation results in two important advantages. First, it provides for sharp fractionation between the wax fractions desired in the product wax and those undesirable fractions which it is intended to eliminate from the product wax by solution and filtration. Second, it provides a means for greatly improving the repulp filtration rates. Without in any way limiting the present invention by the theory, it is believed that the improved filtration rate is the result of a resolution of undesirable soft waxes by increasing the temperature of the diluted mixture and a firming of the solid wax crystal due to the chilling from the intermediate dilute mixture temperature to the final filtration temperature. This firming of the wax crystals results in the formation of a rigid cake that remains porous during the filtration period.

It will be evident from the foregoing detailed description that the present invention provides an improved process for the separation of solid wax from hydrocarbon mixtures comprising wax. This invention is an improvement over prior art processes of separating solid wax from hydrocarbon mixtures comprising wax wherein the wax in solid form is separated from a solution of the other components of the mixture using a suitable solvent. By the present invention, solvent is added to the mixture containing solid wax, the temperature of the dilute mixture increased to dissolve a minor portion of the solid wax, and the temperature of the dilute mixture thereafter reduced to the separation or filtration temperature.

While the process disclosed herein has been described as particularly applicable to the separation of wax, it is contemplated that the process will find application in numerous other industrial uses involving the separation of solidifiable components from mixtures of such components with liquids. For example, the process of the present invention may be applied to the separation of solidifiable constituents from liquid oils such as those derived from animal and vegetable sources. The invention is also useful for the separation by filtration of liqueflable solid materials from mixtures of such solids using a selective solvent to effect liquefaction of the portion to be separated.

Numerous improved results are obtained in contrast to conventional processes wherein the solvent is added to the hydrocarbon mixture at the filtering temperature or at a temperature above or below the filtering temperature followed merely by adjustment of the temperature upwardly or downwardly to the filtering temperature.

Various modifications of the present invention may be practiced without departing from the scope of the invention as defined in the appended claims.

We claim:

1. In a process for the separation of wax in solidified form from a mixture comprising wax wherein a wax cake at a reduced temperature containing components other than the desired wax is admixed with a solvent for components of the mixture other than the desired wax, the resulting dilute mixture warmed to a separation temperature such that the desired wax is present in the dilute mixture in solidified form and undesired wax and other components of the mixture are in solution and the desired wax in solid form is separated from the solution, the improvement which comprises increasing the temperature of the dilute mixture comprising wax and solvent to a temperature above the separation temperature in the range of 5-50° F. by an amount such that from about 2 to about 30 weight percent of the desired wax is dissolved in the solvent, thereafter reducing the temperature of the dilute mixture to said separation temperature and separating the desired solidified wax from the solution at said separation temperature.

2. In a process for the separation of wax from a hydrocarbon oil stock wherein said stock is diluted with a dewaxing solvent, chilled to a dewaxing temperature, and solidified wax containing entrapped oil separated from the oil and solvent in a primary separation step and the separated wax is thereafter repulped with additional dewaxing solvent and subjected to secondary separation at a wax cake de-oiling temperature to recover a desired de-oiled wax fraction, the improvement which comprises raising said repulped wax cake to a temperature in the range of about 5-50° F. above said secondary separation temperature at which from about 2-30% of the desired solidified wax is dissolved in the solvent, chilling the resulting repulped mixture to said secondary separation temperature, and separating the wax therefrom.

3. The process according to claim 2 wherein said secondary separation temperature approximates the temperature of primary separation.

WYNKOOP KIERSTED, JR.
HOWARD H. GROSS.

REFERENCES CITED

The following references are of record in the file of this patent:

UNITED STATES PATENTS

| Number | Name | Date |
|---|---|---|
| 2,045,567 | Beynon | June 30, 1936 |
| 2,077,712 | Roberts et al. | Apr. 20, 1937 |
| 2,085,519 | Verver | June 29, 1937 |
| 2,126,493 | McKittrick et al. | Aug. 9, 1938 |
| 2,229,658 | Jenkins | Jan. 28, 1941 |
| 2,284,607 | Marshall | May 26, 1942 |
| 2,356,346 | Packie et al. | Aug. 22, 1944 |
| 2,446,514 | Stewart et al. | Aug. 3, 1948 |
| 2,486,014 | Evans | Oct. 25, 1949 |